(12) United States Patent
Shaw

(10) Patent No.: US 8,230,275 B2
(45) Date of Patent: Jul. 24, 2012

(54) USE OF PARITY BITS TO DETECT MEMORY INSTALLATION DEFECTS

(75) Inventor: Mark Shaw, Garland, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1775 days.

(21) Appl. No.: 11/138,005

(22) Filed: May 26, 2005

(65) Prior Publication Data

US 2006/0270259 A1    Nov. 30, 2006

(51) Int. Cl.
G11C 29/00 (2006.01)
G01R 31/28 (2006.01)
G06F 11/00 (2006.01)
H03M 13/00 (2006.01)

(52) U.S. Cl. .......................... 714/718; 714/732; 714/800

(58) Field of Classification Search .................. 714/718, 714/732, 800
See application file for complete search history.

(56) References Cited

U.S. PATENT DOCUMENTS

| | | | | |
|---|---|---|---|---|
| 3,735,255 A | * | 5/1973 | Goldman | 324/73.1 |
| 4,149,038 A | * | 4/1979 | Pitroda et al. | 370/244 |
| 4,744,025 A | * | 5/1988 | Lipcon et al. | 711/172 |
| 4,817,092 A | * | 3/1989 | Denny | 714/10 |
| 4,864,531 A | * | 9/1989 | Quatse et al. | 714/52 |
| 4,891,811 A | * | 1/1990 | Ash et al. | 714/719 |
| 4,962,501 A | * | 10/1990 | Byers et al. | 714/805 |
| 5,477,553 A | | 12/1995 | Kong | |
| 5,541,934 A | | 7/1996 | Marietta et al. | |
| 5,835,511 A | * | 11/1998 | Christie | 714/802 |
| 6,185,718 B1 | | 2/2001 | Dell et al. | |
| 6,381,715 B1 | | 4/2002 | Bauman et al. | |
| 6,463,550 B1 | | 10/2002 | Cepulis et al. | |
| 6,766,469 B2 | | 7/2004 | Larson et al. | |
| 6,775,791 B2 | | 8/2004 | McAfee | |
| 6,961,880 B2 | * | 11/2005 | Frankowsky | 714/718 |

OTHER PUBLICATIONS

Author Unknown, IEEE Std. 1149.1 (JTAG) Testability Primer, Texas Instruments, 1997 Semiconductor Group, 1996 (month not at issue).

* cited by examiner

Primary Examiner — Joseph D Torres

(57) ABSTRACT

Various systems and methods for detecting subsystem installation defects are provided. In one example method, a test value is generated in a detection tool to be applied to a subsystem through a plurality of interconnects. A first parity bit is then generated for the test value using the detection tool, and the test value is transmitted to the subsystem. A second parity bit is generated for the test value in the subsystem. Then, the first parity bit is compared with the second parity bit to determine if a fault exists in one of the interconnects.

12 Claims, 3 Drawing Sheets

USE OF PARITY BITS TO DETECT MEMORY INSTALLATION DEFECTS

BACKGROUND

The use of memory cards in processor based systems is commonplace in the computing world. In some large scale processing systems, many memory cards may be employed simultaneously and may be coupled to a so called "cell" board. Such memory cards may be, for example, Dual Inline Memory Modules (DIMMs) or other types of memory cards. For example, in one large processor based system, it is not unheard of that multiple memory cards may be employed. For example, large banks of memory cards may be coupled to a processing system that may include 32 or more memory cards.

In order to access the memory on the memory cards, memory controllers may be employed to issue various control information to the memory cards. In order to facilitate communication with memory cards over a bus, a processor based system may include a cell board or other circuit board that includes connectors to facilitate the installation of other memory cards. The memory cards may include contacts that mate with contacts within the connectors. In one typical connection, memory cards include contacts on an edge that acts like a plug that slides into connectors on a cell board and is latched into place, thereby presumably establishing good electrical contact between the respective contacts of the respective memory card and the connector.

Unfortunately, it is not always the case that good electrical contact is established in this manner. Specifically, it may be the case that the edge of the memory card is not properly seated in the connector. Alternatively, dust or other contaminants may have accumulated in a connector that is forced between contacts of the memory card and contacts of the connector, forcing a discontinuity. Also, it may be case that multiple contacts of the memory card come into electrical contact with a single contact of the connector where the memory card is improperly seated. Also, solder joints and other components on the memory card that route signals from the connector may be faulty. In any event, these conditions and other conditions not discussed herein may result in a fault that creates errors during write and read operations involving the memory in the respective memory card.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
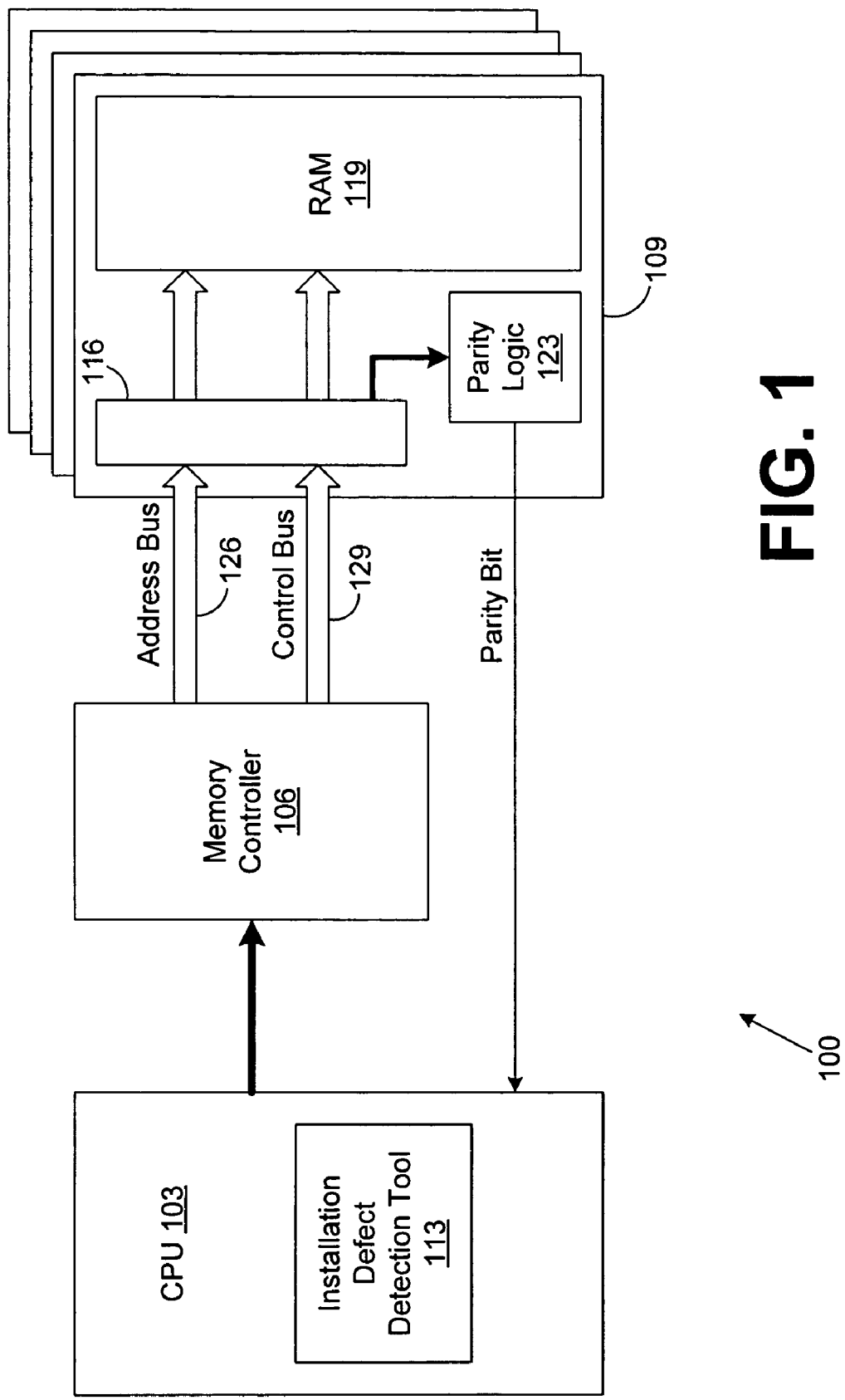
FIG. 1 is a drawing of a processor based system with memory cards that employs a detection tool that tests for faults in interconnects of the memory cards according to an embodiment of the present invention.

With reference to FIG. 1, shown is a processor based system 100 that employs parity bit comparison to detect memory card installation defects according to an embodiment of the present invention. The processor based system 100 includes a central processor unit (CPU) 103, a memory controller 106, and a number of memory cards 109. Executed, for example, by the CPU 103 is an installation defect detection tool 113 according to an embodiment of the present invention. The installation defect detection tool 113 is executed to detect a defect in the installation of the one or more memory cards 109 as will be discussed. In addition, while the following discussion references memory cards 109, it is understood that the memory cards 109 may be replaced with any appropriate subsystem or module that performs other functions beyond that of data storage, etc.

The memory cards 109 each include an input buffer 116, a random access memory 119, and parity logic 123. A memory controller 106 is coupled to the input buffer 116 by way of an address bus and a control bus. In addition, other busses may be coupled between the memory controller 106 and the memory cards 109, such as, for example, a data bus and other conductors employed to establish electrical communication as is typical.

Each of the memory cards 109 includes a random access memory (RAM) 119 or other memory components to which the CPU 103 may write data or from which the CPU 103 may read data as can be appreciated. In this respect, the memory cards 109 may comprise, for example, a dual in-line memory module (DIMM), a single in-line memory module (SIMM), or other type of memory card.

The memory cards 109 may be plugged into connectors on a cell board, motherboard, or other circuit board as can be appreciated.

In addition, the processing based system 100 includes an address bus 126 and a control bus 129 that is coupled between the memory controller 106 and each of the memory cards 109. The address bus 126 and the control bus 129 are coupled to the input buffer 116 through a connector that facilitates the electrical connection of the memory cards 109 to the cell board or motherboard for general operation of the processor based system 100. Unfortunately, it is sometimes the case that the interconnections between the contacts of the memory cards 109 and the corresponding contacts in the connector on the cell board or motherboard do not make good electrical contact, thereby resulting in a fault as will be described. In this respect, the fault may be, for example, a short between adjacent contacts, a discontinuity between respective contacts, or some other problem that prevents or hampers desired electrical communication.

The installation defect detection tool 113 is executed in the CPU 103 in order to detect such faults. For example, in one embodiment, the installation defect detection tool 113 detects faults in the interconnections of the address bus 126 and the control bus to the memory cards 109. In addition, other busses may be coupled from the cell board or motherboard, for example, to the memory cards 109. Such busses may be, for example, a data bus or other conductors as can be appreciated.

Figure 2:
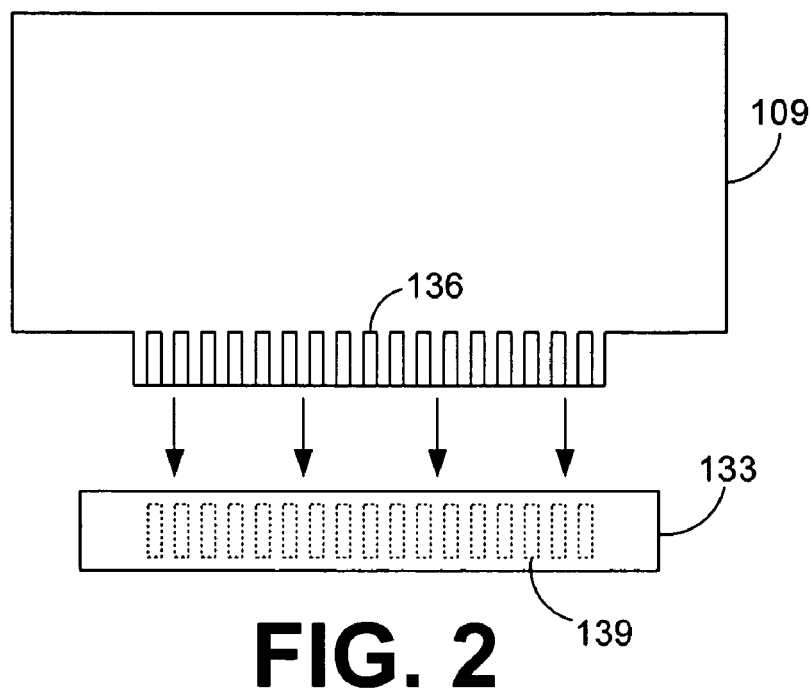
FIG. 2 is a drawing of a memory card of FIG. 1 as it plugs into a receptacle of the processor based system of FIG. 1 according to an embodiment of the present invention.

Referring next to FIG. 2, shown is one example of a memory card 109 that is inserted into a receptacle 133. The memory card 109 includes a number of contacts 136 that mate up with contacts 139 in the receptacle 133. Each mated pair of contacts 136 and 139 form an interconnect. Each of the interconnects facilitates, for example, the connection of one of the conductors of the address bus 126 (FIG. 1) or the control bus 129 (FIG. 1), or the conductors of other busses that facilitate communication between the memory controller 106 and the memory cards 109, or between the memory cards 109 and other components in the processor based system 100. When the contacts 136 of the memory card 109 are inserted into the receptacle 133, sometimes it is the case that the respective contacts 136 and 139 fail to make good electrical contact, thereby resulting in a fault that prevents full data communication between the memory controller 136 and the respective memory card 109.

Specifically, the fault may exist in the conductors associated with the address bus 126, the control bus 129, or other busses such as data busses, etc. The faults may be due to the fact, for example, that the contacts 136 of the memory card 109 fail to line up properly with the contacts 139 of the receptacle 133, thereby resulting in a discontinuity or a short between adjacent contacts. Also, dust or other particulate matter may have been deposited over the contacts 139 of the receptacle 133 and become wedged between the contacts 136 of the memory card 109 and the contacts 139 of the receptacle 133 when the memory card 109 is inserted into the receptacle 133, thereby preventing good electrical contact. In addition, other reasons may exist as to why a failure of good electrical contact occurs when the memory card 109 is inserted into the receptacle 133.

Referring back to FIG. 1, next a discussion of the operation of the installation defect detection tool 113 is provided that illustrates how the installation defect detection tool 113 detects a fault in one or more interconnects between a given memory card 109 and a receptacle 133 (FIG. 2) into which the memory card 109 has been inserted to facilitate data communication between a memory card 109 and the CPU 103. In one embodiment, the installation defect detection tool 113 first generates a test value that is to be applied to a respective one of the memory cards 109 through the various interconnects of the contacts 136 and 139 (FIG. 2). Thereafter, the installation defect detection tool 113 generates a first parity bit for the test value. Next, test value is transmitted to the memory card 109. In one embodiment, the test value is transmitted via the address bus 126 and the control bus 129. This is so the conductors associated with the interconnects of the address bus 126 and the control bus 129 may be tested for faults.

Next, a second parity bit for the same test value is generated in the memory card 109 by the parity logic 123. Thereafter, this second parity bit is transmitted back to the CPU 103 to the installation defect detection tool 113. The transmission of the second parity bit may be accomplished by transmitting the same over a data bus from the memory card 109 to the CPU 103 or over some other bus. The installation defect detection tool 113 then compares the first parity bit with the second parity bit to determine if a fault exists in one of the interconnects associated with the address bus 126 and the control bus 129. If the parity bits are not equal, then it may be assumed that a fault exists in one of the interconnects as the test value had changed from the time it was generated by the installation defect detection tool 113 and the time it was received by the memory card 109, thereby indicating that a fault existed on the address bus 126 of the control bus 129.

If a fault has been detected, then the installation defect detection tool 113 indicates that a fault exists in one of the interconnects by generating an appropriate output that is displayed on a display device to inform a user that a fault exists. IN this respect, the installation defect detection tool 113 tracks the location or designation of the particular memory card 109 so that it can provide an indication as to which specific memory card 109 has experienced the fault. Alternatively, output devices other than a display device may be employed such as, for example, a printer, or indicator lights that will indicate whether and where a fault exists as described above.

As described above, the installation defect detection tool 113 provides an advantageous approach to employ in testing the interconnects associated with the address bus 126 and/or the control bus 129. Specifically, the interconnects associated with the address bus are tested when at least a portion of the test value is transmitted to the memory card 109 over the address lines of the address bus 126. Alternatively, at least a portion of the test value may also be transmitted over the control lines associated with the control bus 129.

In addition, a number of different test values may be generated by the installation defect detection tool 113 that are applied to the memory card 109 through the interconnects associated with the address bus 126 and the control bus 129. Each of these values may include, for example, all zeros except for a single "logical one". In this respect, each of the test values that are generated may include a single digit that is 1 that is transmitted by a respective one of the conductors of the address bus 126/control bus 129. Where a parity mismatch is detected upon the transmission of such a test value, then it can be assumed that the fault may be associated with the given interconnect associated with the conductor over which the value of 1 has been transmitted.

Alternatively, the results of each of the parity mismatches may be examined in an attempt to determine which interconnect has a fault. As an additional alternative, it may not be important to actually determine which interconnect has experienced a fault for a particular memory card 109. Rather, just knowing which memory card 109 is experiencing a fault facilitates the replacement of such memory card 109. This prevents users from having to try to determine where the fault exists in which memory card 109 by repeatedly replacing individual ones of the memory cards 109 on a trial by error basis. This approach is undesirable as it may take a significant period of time at significant expense.

Figure 3:
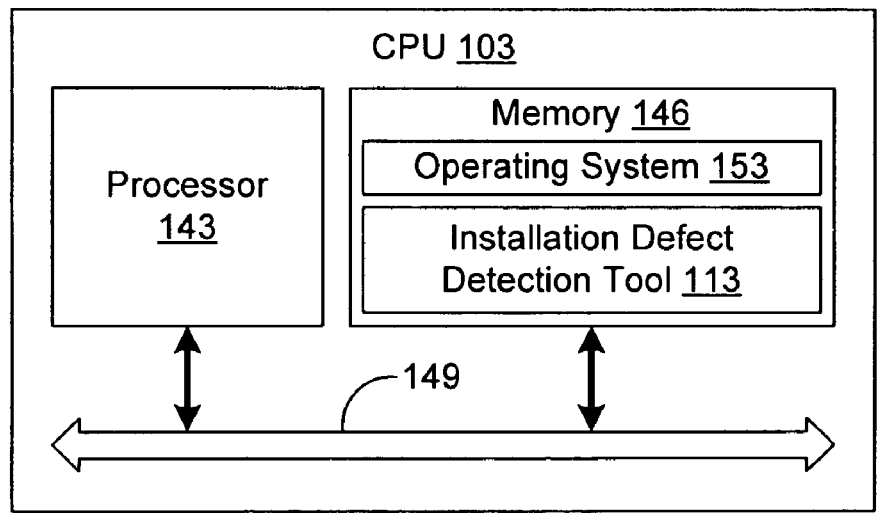
FIG. 3 is a block diagram that depicts one example of the detection tool of FIG. 1 according to an embodiment of the present invention.

With reference next to FIG. 3, shown is one example of an implementation of the installation defect detection tool 113 as executable by the central processing unit 103 according to an embodiment of the present invention. In this respect, the CPU 103 comprises a processor 143 and a memory 146, both of which are coupled to a local interface 149. The local interface 149 may be, for example, a data bus with accompanying control/address busses as can be appreciated by those with ordinary skill in the art. The local interface 149 may also include, for example, the memory controller 106.

Stored in the memory 146 and executable by the processor 143 are an operating system 153 and one embodiment of the installation defect detection tool 113. In addition, many other components may be stored in the memory 146 and executed by the processor 143 that are not discussed herein. In this respect, the term "executable" means a program file that is in a form that can ultimately be run by the processor 143. Examples of executable programs may be, for example, a compiled program that can be translated into machine code in a format that can be loaded into a random access portion of the memory 146 and run by the processor 143, or source code that may be expressed in proper format such as object code that is capable of being loaded into a random access portion of the memory 146 and executed by the processor 143, etc. An executable program may be stored in any portion or component of the memory 146 including, for example, random access memory, read-only memory, a hard drive, compact disk (CD), floppy disk, or other memory components.

The memory 146 is defined herein as both volatile and nonvolatile memory and data storage components. Volatile components are those that do not retain data values upon loss of power. Nonvolatile components are those that retain data upon a loss of power. Thus, the memory 146 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device. In this respect, the memory 146 may comprise one of the Random Access Memories (RAM) 119 on one or more of the memory cards 109.

In addition, the processor 143 may represent multiple processors and the memory 146 may represent multiple memories that operate in parallel. In such a case, the local interface 149 may be an appropriate network that facilitates communication between any two of the multiple processors, between any processor and any one of the memories, or between any two of the memories etc. The processor 143 may be of electrical, optical, or molecular construction, or of some other construction as can be appreciated by those with ordinary skill in the art.

The operating system 153 is executed to control the allocation and usage of hardware resources such as the memory, processing time and peripheral devices in the CPU 103. In this manner, the operating system 153 serves as the foundation on which applications depend as is generally known by those with ordinary skill in the art.

Figure 4:
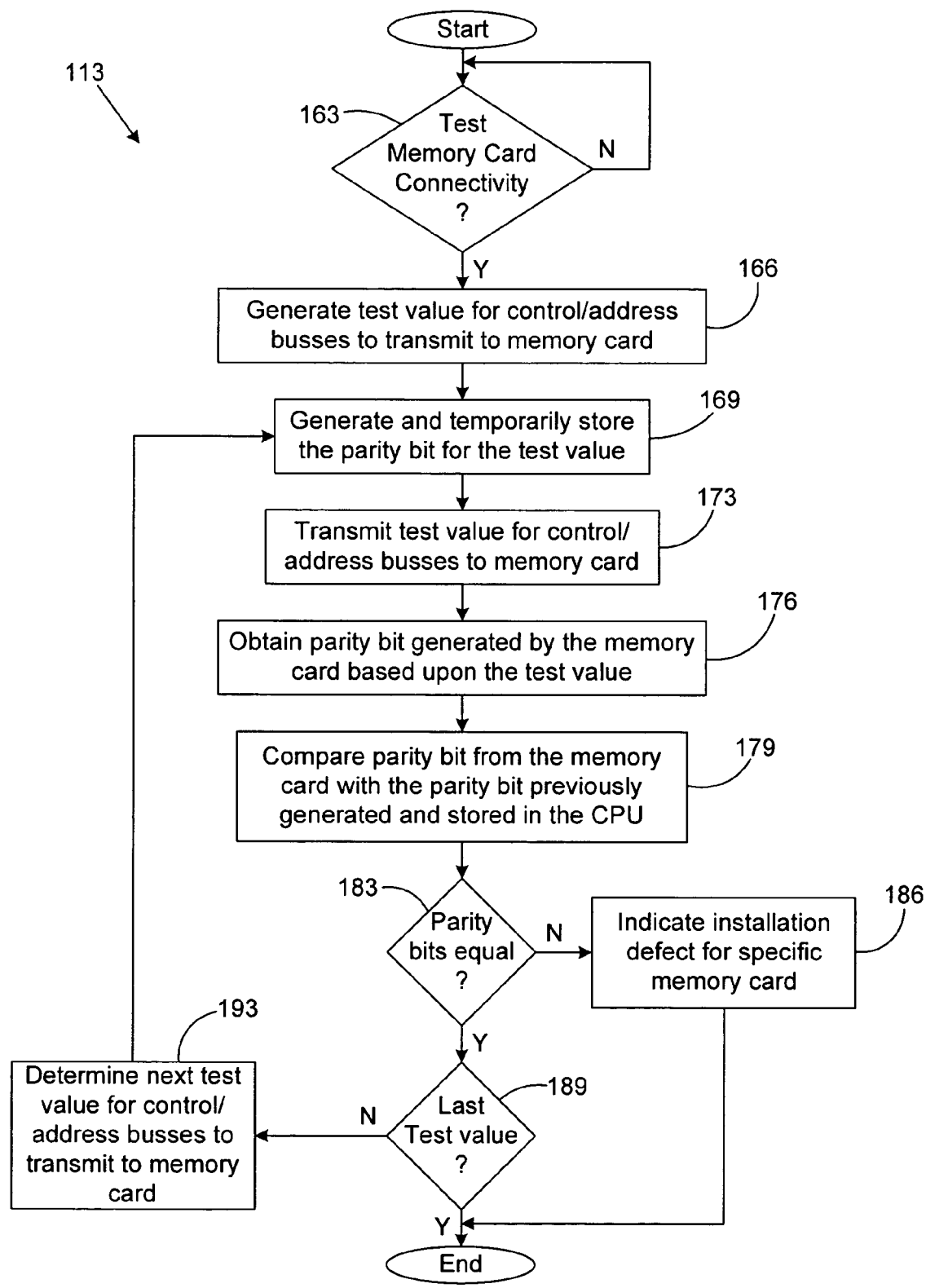
FIG. 4 is a flow chart of one example of the detection tool employed in the processor circuit of FIG. 2 according to an embodiment of the present invention.

Referring next to FIG. 4, shown is a flow chart that provides one example of the operation of the installation defect detection tool 113 in the form of logic that is executed by the CPU 103 (FIG. 3) according to an embodiment of the present invention. Alternatively, the flow chart of FIG. 4 may be viewed as depicting steps of an example of a method implemented to detect whether there are any faults in any of the interconnects of the address and control busses 126 (FIG. 1) and 129 (FIG. 1) for a given memory card 109 (FIG. 1). The functionality of the installation defect detection tool 113 as depicted by the example flow chart of FIG. 4 may be implemented, for example, in an object oriented design or in some other programming architecture. Assuming the functionality is implemented in an object oriented design, then each block represents functionality that may be implemented in one or more methods that are encapsulated in one or more objects. The installation defect detection tool 113 may be implemented using any one of a number of programming languages such as, for example, C, C++, Assembly, or other programming languages.

To begin, at box 163 it is determined whether the installation defect detection tool 113 is to be executed to check the interconnects associated with one of the memory cards 109. In this respect, the installation defect detection tool 113 may be executed multiple times, for example, to test each memory card 109 assuming there are in fact multiple memory cards 109 to test.

In one embodiment, the interconnects may be those associated with the coupling of an address bus 126 and a data bus 129 as described above. The installation defect detection tool 113 may be executed, for example, at power up of the processor based system 100 (FIG. 1) or at other times as desired to ensure the integrity of the electrical connections of the respective interconnects. Next, in box 166, the installation defect detection tool 113 generates a test value to be applied to a memory card 109 through the respective interconnects. Then, in box 169 a parity bit is generated for the test value and is stored in the memory 146.

Next, in box 173, the test value is transmitted to the respective memory card 109. In one embodiment, at least a portion of the test value is transmitted to the memory card 109 over the address lines of the address bus 126 employed to access and store data in portions of a memory 119 on the memory card 103. Also, according to one embodiment, at least a portion of the test value is transmitted to the memory card 109 over the control lines of the control bus 129 employed to control an operation of a memory 119 on the memory card 109.

Thereafter, in box 176 the installation defect detection tool 113 obtains a parity bit generated by the memory card 109. In this respect, the memory card 109 includes the parity logic 123 (FIG. 1) that generates the parity bit based upon the test value received in the memory card 109 from the installation defect detection tool 113. The memory card 109 transmits the parity bit generated to the installation defect detection tool 113 via a data bus or other bus.

Next, in box 179, the parity bit initially generated and stored by the installation defect detection tool 113 is compared with the parity bit from the memory card 109. If the parity bits are equal as determined in box 183, then the installation defect detection tool 113 proceeds to box 186 in which an indication as to the existence of a fault on the respective memory card 109 is rendered for a user on a display device or other output device. In indicating the existence of a fault, the installation defect detection tool 113 may indicate which specific memory card 109 has experienced a fault, of the installation defect detection tool 113 may indicate which interconnect on which memory card 109 has experienced the fault. Once the existence of the fault has been indicated, the installation defect detection tool 113 ends as shown.

However, assuming that the installation defect detection tool 113 determines that the parity bits are equal in box 183, then in box 189 the installation defect detection tool 113 determines whether the last test value has been transmitted to the memory card 109. In this respect, multiple test values may be transmitted in attempts to detect defects in each of the interconnects on an individual basis. For example, assuming that the address bus 126 was eight bits wide, then values such as 00000001, 00000010, 00000100, 00001000, 00010000, 00100000, 01000000, and 10000000 may be transmitted over the address bus 126 to the memory card 109 to detect potential defects in each of the eight conductors of the address bus 126. Specifically, if a parity mismatch is detected for any one of these numbers, then chances are that the interconnect having a defect is either that over which the value of "1" was transmitted or adjacent interconnects shorted with such interconnect, etc. Note that the values transmitted over the address bus 126 as described above may each be a portion of a larger value that is transmitted over both the address bus 126 and the control bus 129 as described above.

Assuming that the last text value has not been transmitted as determined in box 189, then the installation defect detection tool 113 proceeds to box 193 in which the next text value is generated for transmission to the memory card 109. Thereafter, the installation defect detection tool 113 reverts back to box 169 as shown. If the final test value has been transmitted in box 189, then the installation defect detection tool 113 ends as shown as not defect was detected. Assuming that other memory cards 109 exist to be tested, the installation defect detection tool 113 is executed for the next memory card 109.

Although the installation defect detection tool 113 embodied in software or code executed by general purpose hardware as discussed above with reference to FIGS. 3 and 4, as an alternative the same may also be embodied in dedicated hardware or a combination of software/general purpose hardware and dedicated hardware. If embodied in dedicated hardware, the installation defect detection tool 113 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 4 shows the architecture, functionality, and operation of an implementation of the installation defect detection tool 113. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flow chart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the installation defect detection tool 113 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the installation defect detection tool 113 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A system for detecting a memory card installation defect, comprising:
a detection tool configured to be implemented in a system having at least one memory card with a memory coupled to a processor via a bus, wherein the bus comprises at least one control line employed to control an operation of the memory on the memory card, the detection tool comprising:
logic that generates a test value to be applied to the memory card over the bus through a plurality of interconnects;
logic that generates a first parity bit for the test value;
logic that transmits the test value to the memory card over the bus through the interconnects, wherein at least a portion of the test value is transmitted to the memory card over the control lines; and
logic that compares the first parity bit with a second parity bit to determine if a fault exists in one of the interconnects, wherein the second parity bit is generated for the test value in the memory card.

2. The system of claim 1, wherein the memory card further comprises:
a parity bit generator that generates the second parity bit based upon the test value; and
logic that transmits the second parity bit to the detection tool via the bus.

3. The system of claim 1, wherein the detection tool further comprises logic that generates an indication on a display device that the fault exists in one of the interconnects if the first parity bit does not equal the second parity bit.

4. The system of claim 1, wherein the bus comprises a plurality of address lines employed to access and store data in portions of the memory on the memory card, and wherein at least a portion of the test value is transmitted to the memory card over the address lines.

5. The system of claim 1, wherein the logic that generates the test value further comprises logic that generates a plurality of test values to be applied to the memory card over the bus through the plurality of interconnects.

6. The system of claim 5, wherein the logic that generates a first parity bit for the test value, the logic that transmits the test value to the memory card over the bus, and the logic that compares the first parity bit with the second parity bit to determine if the fault exists in one of the interconnects are executed for each of the test values.

7. A system for detecting a memory card installation defect, comprising:
a detection tool configured to be implemented in a system having at least one memory card with a memory coupled to a processor via a bus, the bus comprising a plurality of control lines employed to control an operation of the memory on the memory card, the detection tool comprising:

means for generating a test value to be applied to the memory card over the bus through a plurality of interconnects;

means for generating a first parity bit for the test value;

means for transmitting the test value to the memory card over the bus through the interconnects, wherein at least a portion of the test value is transmitted to the memory card over the control lines; and means for comparing the first parity bit with a second parity bit to determine if a fault exists in one of the interconnects, wherein the second parity bit is generated for the test value in the memory card.

8. The system of claim 7, wherein the memory card further comprises:

means for generating the second parity bit based upon the test value; and means for transmits the second parity bit to the detection tool via the bus.

9. The system of claim 7, wherein the detection tool further comprises means for generating an indication on a display device that the fault exists in one of the interconnects if the first parity bit does not equal the second parity bit.

10. The system of claim 7, wherein the bus comprises a plurality of address lines employed to access and store data in portions of the memory on the memory card, and wherein at least a portion of the test value is transmitted to the memory card over the address lines.

11. The system of claim 7, wherein the means for generating the test value further comprises means that generates a plurality of test values to be applied to the memory card over the bus through the plurality of interconnects.

12. The system of claim 11, wherein the means for generating the first parity bit for the test value, the means for transmitting, and the means for comparing the first parity bit with the second parity bit to determine if the fault exists in one of the interconnects, are each implemented for each of the test values.

* * * * *

UNITED STATES PATENT AND TRADEMARK OFFICE
CERTIFICATE OF CORRECTION

| | |
|---|---|
| PATENT NO. | : 8,230,275 B2 |
| APPLICATION NO. | : 11/138005 |
| DATED | : July 24, 2012 |
| INVENTOR(S) | : Mark Shaw |

Page 1 of 1

It is certified that error appears in the above-identified patent and that said Letters Patent is hereby corrected as shown below:

In the Claims:

In column 9, line 17, in Claim 8, delete "transmits" and insert -- transmitting --, therefor.

Signed and Sealed this
Tenth Day of September, 2013

Teresa Stanek Rea
*Acting Director of the United States Patent and Trademark Office*